US012185764B2

(12) United States Patent
Reevell

(10) Patent No.: US 12,185,764 B2
(45) Date of Patent: Jan. 7, 2025

(54) AEROSOL GENERATING SYSTEM WITH SELF-ACTIVATED ELECTRIC HEATER

(71) Applicant: Altria Client Services LLC, Richmond, VA (US)

(72) Inventor: Tony Reevell, London (GB)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 927 days.

(21) Appl. No.: 17/239,855

(22) Filed: Apr. 26, 2021

(65) Prior Publication Data

US 2021/0243844 A1 Aug. 5, 2021

Related U.S. Application Data

(60) Division of application No. 16/199,866, filed on Nov. 26, 2018, now Pat. No. 11,013,262, which is a (Continued)

(30) Foreign Application Priority Data

Nov. 17, 2015 (EP) .................................... 15194990

(51) Int. Cl.
*A24F 40/50* (2020.01)
*H05B 1/02* (2006.01)
(Continued)

(52) U.S. Cl.
CPC ........... *A24F 40/50* (2020.01); *H05B 1/0244* (2013.01); *H05B 3/04* (2013.01); *H05B 3/44* (2013.01);
(Continued)

(58) Field of Classification Search
None
See application file for complete search history.

(56) References Cited

U.S. PATENT DOCUMENTS 4,365,169 A 12/1982 Weston
6,252,494 B1 6/2001 Howell
(Continued)

FOREIGN PATENT DOCUMENTS

CN 103338665 A 10/2013
CN 103889258 A 6/2014
(Continued)

OTHER PUBLICATIONS

Mexican Office Action mailed Feb. 22, 2022.
(Continued)

*Primary Examiner* — James Harvey
(74) *Attorney, Agent, or Firm* — Harness, Dickey & Pierce, P.L.C.

(57) ABSTRACT

An electronic vaping device includes a liquid storage portion, an electric heater and electronic circuitry. The liquid storage portion is configured to store liquid vapor-forming substrate. The electric heater includes at least one heating element, the at least one heating element configured to heat the liquid vapor-forming substrate. The electronic circuitry is configured to self-activate the electric heater for a first time interval during a period of inactivity of the electric heater to determine depletion of the liquid vapor-forming substrate based on a relationship between a power applied to the at least one heating element and a resulting temperature change of the at least one heating element.

21 Claims, 3 Drawing Sheets

Related U.S. Application Data continuation of application No. 15/351,876, filed on Nov. 15, 2016, now Pat. No. 10,165,799, which is a continuation of application No. PCT/EP2016/074798, filed on Oct. 14, 2016.

(51) Int. Cl.

*H05B 3/04* (2006.01)
*H05B 3/44* (2006.01)
*A24F 40/10* (2020.01)

(52) U.S. Cl.

CPC ........ *A24F 40/10* (2020.01); *H05B 2203/014* (2013.01); *H05B 2203/021* (2013.01)

(56) References Cited

U.S. PATENT DOCUMENTS

| | | | |
|---|---|---|---|
| 9,010,335 B1 | 4/2015 | Scatterday | |
| 2007/0267031 A1* | 11/2007 | Hon ...................... | A61M 15/06 131/273 |
| 2009/0320863 A1 | 12/2009 | Fernando et al. | |
| 2010/0283328 A1 | 11/2010 | Eggert | |
| 2010/0313901 A1 | 12/2010 | Fernando et al. | |
| 2011/0036346 A1 | 2/2011 | Cohen et al. | |
| 2012/0038274 A1 | 2/2012 | Chin-Chien et al. | |
| 2012/0042884 A1* | 2/2012 | Mukaddam ............. | A24F 40/65 131/173 |
| 2012/0291791 A1 | 11/2012 | Pradeep | |
| 2013/0037041 A1* | 2/2013 | Worm ..................... | A24F 40/46 131/329 |
| 2013/0104916 A1 | 5/2013 | Bellinger et al. | |
| 2014/0020693 A1 | 1/2014 | Cochand et al. | |
| 2014/0229137 A1 | 8/2014 | Rusnack et al. | |
| 2014/0305450 A1 | 10/2014 | Xiang | |
| 2014/0338685 A1 | 11/2014 | Amir | |
| 2014/0345633 A1 | 11/2014 | Talon et al. | |
| 2016/0212832 A1 | 7/2016 | King | |
| 2016/0242466 A1 | 8/2016 | Lord et al. | |
| 2017/0135406 A1 | 5/2017 | Reevell | |
| 2017/0347707 A1 | 12/2017 | Iang | |
| 2018/0020735 A1 | 1/2018 | Bilat et al. | |
| 2024/0292890 A1* | 9/2024 | Frederick ................ | A24F 40/10 |

FOREIGN PATENT DOCUMENTS

| | | | |
|---|---|---|---|
| EP | 2257195 | | 6/2012 |
| EP | 2468117 | A1 | 6/2012 |
| EP | 2468118 | A1 | 6/2012 |
| EP | 2471392 | B1 | 9/2013 |
| JP | 2014-501107 | A | 1/2014 |
| JP | 2015-507476 | A | 3/2015 |
| KR | 2013-0130759 | A | 12/2013 |
| KR | 2014-0004656 | A | 1/2014 |
| KR | 2014-0118985 | A | 10/2014 |
| SU | 1837814 | A3 | 8/1993 |
| WO | WO-2007/078273 | A1 | 7/2007 |
| WO | WO-2008/077271 | A1 | 7/2008 |
| WO | WO-2009/118085 | | 10/2009 |
| WO | WO-2009/127401 | A1 | 10/2009 |
| WO | WO-2011/137453 | A2 | 11/2011 |
| WO | WO-2011/146329 | A2 | 11/2011 |
| WO | WO-2012/027350 | A2 | 3/2012 |
| WO | WO-2012/072790 | A1 | 6/2012 |
| WO | WO-2012/085203 | A1 | 6/2012 |
| WO | WO-2012/085207 | A1 | 6/2012 |
| WO | WO-2013/060781 | A1 | 5/2013 |
| WO | WO-2013/060784 | A2 | 5/2013 |
| WO | WO-2013/098398 | A2 | 7/2013 |
| WO | WO-2014-040988 | A2 | 3/2014 |
| WO | WO-2014/138244 | A1 | 9/2014 |
| WO | WO-2014/150247 | A1 | 9/2014 |
| WO | WO-2014/166037 | A1 | 10/2014 |
| WO | WO-2014/166121 | A1 | 10/2014 |

OTHER PUBLICATIONS

Korean Notice of Allowance issued Nov. 10, 2023, in Korean Patent Application No. 10-2018-7011898, and English translation.
Korean Office Action and English translation thereof dated Jul. 28, 2023. 10-2018-7011898.
Extended European Search Report for European Application No. 15194990.6 Dated May 23, 2016.
Non-Final Office Action issued Dec. 20, 2017 in U.S. Appl. No. 15/351,876.
Notice of Allowance issued May 2, 2018 in U.S. Appl. No. 15/351,876.
International Search Report issued Jan. 26, 2017 in International Application No. PCT/EP2016/074798.
International Preliminary Report on patentability (Chapter I) issued May 22, 2018 in International Application No. PCT/EP2016/074798.
Written Opinion issued May 26, 2017 in International Application No. PCT/EP2016/074798.
Notice of Allowance issued Sep. 10. 2018 in U.S. Appl. No. 15/351,876.
Decision on Grant and Search Report issued on Oct. 30, 2019 in Russian Application No. 2018121817.
Office Action issued May 21, 2020 in Chinese Application No. 201680061432.0.
Notice of Reasons for Refusal issued Sep. 10, 2020 in Japanese Application No. 2018-544404.
Notification of Grant issued Dec. 1, 2020 in Chinese Application No. 201680061432.0.
Notice of Allowance issued Feb. 10, 2021 in U.S. Appl. No. 16/199,866.
Decision to Grant a Patent issued on Feb. 25, 2021 in Japanese Application No. 2018-544404.

* cited by examiner

AEROSOL GENERATING SYSTEM WITH SELF-ACTIVATED ELECTRIC HEATER

CROSS-REFERENCE TO RELATED APPLICATIONS

This application is a Divisional of U.S. application Ser. No. 16/199,866, filed Nov. 26, 2018, which is a Continuation of U.S. application Ser. No. 15/351,876, filed Nov. 15, 2016, which is a Continuation of, and claims priority to, International Application No. PCT/EP2016/074798, filed on Oct. 14, 2016, and further claims priority under 35 U.S.C. § 119 to European Patent Application No. 15194990.6, filed Nov. 17, 2015, the entire contents of each of which are incorporated herein by reference.

BACKGROUND

Field

One or more example embodiments relate to electrically operated aerosol-generating systems in which an aerosol-forming substrate is contained in a storage portion.

Description of Related Art

Related art electrically heated vaping systems (also referred to as electronic vaping or e-vaping systems) may include a liquid storage portion. The liquid storage portion includes a liquid aerosol-forming substrate, and is connected to a vaporizer comprising an electric heater, which is powered by a battery supply. When an adult vaper applies negative pressure to a mouth-end piece, the battery power supply is switched on to activate the electric heater and vaporize the heated aerosol-forming substrate in the vaporizer. Application of negative pressure to the mouth-end piece by the adult vaper causes vapor to be drawn along or through the vaporizer thereby generating a vapor. The generated aerosol is then drawn through the mouth-end piece.

An amount of depletion of the liquid aerosol-forming substrate is determined based on a relationship between a power applied to the heating element and a resulting temperature change of the heating element once the heating element is activated. The determined amount of depletion may be indicated to the adult vaper.

In the related art, the amount of depletion of liquid aerosol-forming substrate is determined only when the electric heater is active. However, during vaping, the temperature of the active heater varies depending on the amount of concentration of liquid aerosol-forming substrate at the heating element and the concentration of liquid aerosol-forming substrate is affected by the amount of negative pressure applied by an adult vaper. As a result, the precision of the amount of depletion determined during vaping may not be sufficiently accurate.

SUMMARY

According to at least one example embodiment, there is provided an electrically operated aerosol-generating system (also referred to as an electronic vaping system/device or an e-vaping system/device) comprising: a liquid storage portion configured to store a liquid aerosol-forming substrate (also referred to as a liquid vapor-forming substrate); an electric heater including at least one heating element configured to heat the liquid aerosol-forming substrate; and electronic circuitry configured to self-activate the electric heater for a first time interval (also referred to as a self-activation duration) during a period of inactivity of the electric heater to determine depletion of the liquid aerosol-forming substrate based on a relationship between a power applied to the heating element and a resulting temperature change of the heating element.

The electronic circuitry may be configured to estimate an amount of liquid aerosol-forming substrate in the liquid storage portion based on the determined depletion. The amount of liquid aerosol-forming substrate in the liquid storage portion may be an absolute amount or a relative amount (e.g., a percentage value) or may be a determination that there is more or less than a threshold amount of liquid aerosol-forming substrate in the liquid storage portion.

Self-activating the electric heater may refer to activating the electric heater at a time when the electric heater is not activated in response to application of negative pressure by an adult vaper, for example, for the purpose of determining an amount of depletion of liquid aerosol-forming substrate.

Providing electronic circuitry for self-activating the electric heater and determining depletion of liquid aerosol-forming substrate delivered to the heater may be advantageous for a number of reasons. For example, the depleted amount of liquid aerosol-forming substrate may be retrieved from the latest self-activation, and thus, the adult vaper need not vape in order to activate the electric heater for retrieving the latest amount of depletion.

The electric heater is self-activated when generation of aerosol (also referred to herein as vapor) by the heater is not initiated by an adult vaper, which may be the case between a series of applications of negative pressure by the adult vaper. Therefore, one or more example embodiments allow for determining consumption of liquid aerosol-forming substrate at various points of time.

The consumption of liquid aerosol-forming substrate may be determined when the electric heater has cooled. The consumption of liquid aerosol-forming substrate may be determined when the concentration of the liquid aerosol-forming substrate at the heating element has reached a maximum threshold value. In an aerosol-generating system comprising a wick as a capillary medium to transport the liquid aerosol-forming substrate from the liquid storage portion to the heating element, the wick draws the liquid aerosol-forming substrate until reaching equilibrium or substantial equilibrium.

The consumption of liquid aerosol-forming substrate may be determined when the electronic circuitry does not process another task, or has a processing load below a threshold. According to at least one example embodiment, the consumption of liquid aerosol-forming substrate is determined when at least two (e.g., all) of the aforementioned situations occur.

The self-activation of the electric heater allows for determining a level of liquid aerosol-forming substrate in the liquid storage portion before further application of negative pressure by an adult vaper. This may suppress and/or prevent vaping of an aerosol-generating system when there are relatively low levels of liquid aerosol-forming substrate, which may be advantageous since heating with low levels of liquid aerosol-forming substrate may lead to overheating and/or potential problems resulting therefrom such as permanent damage to the aerosol-generating system.

With the self-activation of the electric heater, the determination of an amount of depletion may be controlled more precisely and need not be performed each time an adult vaper is vaping. Advantageously, the level of liquid aerosol-forming substrate is determined independently from vaping by an adult vaper. Power consumption may be limited by infrequent use of the self-activation.

During regular vaping of the aerosol-generating system, the electronic circuitry may further be configured to activate the electric heater for a desired (or, alternatively, particular) activation duration in response to a request to generate vapor.

In at least one example, the self-activation duration of the electric heater is shorter than an activation duration of the electric heater upon the request to generate vapor by an adult vaper. According to at least some example embodiments, the self-activation duration may be less than about 1.0 second. That is, for example, the self-activation duration is one of about 0.1 seconds, about 0.2 seconds, about 0.3 seconds, about 0.4 seconds, about 0.5 seconds, about 0.6 seconds, about 0.7 seconds, about 0.8 seconds, about 0.9 seconds, and about 1.0 second.

According to at least some example embodiments, the electronic circuitry is configured to self-activate the electric heater only upon an occurrence of at least one self-activation precondition.

A first self-activation precondition (also referred to as a self-activation condition) may be a desired (or, alternatively, predetermined) duration of inactivity of the electric heater. The self-activation may be performed once a threshold time has elapsed for the liquid aerosol-forming substrate to be replenished at the electric heater.

A second self-activation precondition may be a desired (or, alternatively, predetermined) number of requested activations of the electric heater for generating vapor.

A third self-activation precondition may occur when the temperature of the electric heater is below a minimum threshold temperature threshold after a requested activation of the electric heater for generating vapor.

A fourth self-activation precondition may occur when the concentration of the liquid aerosol-forming substrate at the heating element has reached a maximum threshold value after a requested activation of the electric heater for generating vapor.

According to at least some example embodiments, the electronic circuitry is configured to self-activate the electric heater at least one more time in sequence to confirm the determined depletion of liquid aerosol-forming substrate of a previous measurement. The resultant determined depletion may be an average value of the single estimates. A determined depletion may be confirmed by at least a second estimate that differs from the first estimate by a measurement error that is below a measurement error threshold.

According to at least some example embodiments, the electronic circuitry is configured to estimate an amount of liquid aerosol-forming substrate in the liquid storage portion based on the determined depletion.

According to at least some example embodiments, the electronic circuitry is configured to self-activate the electric heater more frequently as the determined amount of liquid aerosol-forming substrate stored in the liquid storage portion decreases. When the level of liquid aerosol-forming substrate is approaching an empty state, the self-activations and resulting measurements may be taken more frequently. This enables the aerosol-generating system to use less power in determining the level of liquid aerosol-forming substrate when the liquid storage portion is relatively full. When the liquid storage portion approaches more sensitive levels, more readings are taken so that the end of life for the liquid storage portion is not missed.

According to at least some example embodiments, the electronic circuitry is configured to ignore requests for generating aerosol upon determining the volume of liquid aerosol-forming substrate stored in the liquid storage portion is below a minimum volume threshold, thereby suppressing and/or preventing activation of the electric heater.

According to at least some example embodiments, the aerosol-generating system further comprises a temperature sensor configured to measure the temperature of the at least one heating element. The electronic circuitry is configured to monitor the temperature of the at least one heating element as sensed by the temperature sensor, and to determine depletion of liquid aerosol-forming substrate heated by the heater based on the temperature sensed by the temperature sensor.

According to at least some example embodiments, the electronic circuitry is configured to measure the electrical resistance of the at least one heating element to ascertain the temperature of the heating element based on the measured electrical resistance.

According to at least some example embodiments, the electronic circuitry is configured to measure the electrical resistance of the at least one heating element by measuring the current through the at least one heating element and the voltage across the at least one heating element, and determining the electrical resistance of the at least one heating element based on the measured current and voltage.

The relationship between a temperature of the heating element and the power applied to the heating element may be, for example, a rate of change of temperature of the heating element for a given power applied, an absolute temperature of the heating element at a given time during the self-activation for a given power applied, an integral of temperature over the self-activation duration for a given power applied or a power applied to the heating element in order to maintain a given temperature.

In more general terms, the less liquid aerosol-forming substrate is delivered to the heater for vaporization, the higher the temperature of the heating element will be for a given applied power. For a given power, the evolution of the temperature of the heating element during the self-activation, and how that evolution changes over a plurality of self-activations, may be used to detect if there has been a threshold amount of depletion in the amount of aerosol-forming substrate delivered to the electric heater.

According to at least some example embodiments, the electric heater comprises at least one heating element. The heating element may comprise an arrangement of filaments. The at least one heating element may be in the form of a heating wire, a coil or an encircling filament, etc.

The at least one heating element may include an electrically resistive material. The at least one heating element may heat the liquid aerosol-forming substrate by conduction.

The heating element may be at least partially in contact with the liquid aerosol-forming substrate. Alternatively, a heat conductive element may conduct the heat from the heating element to the liquid aerosol-forming substrate.

According to at least some example embodiments, the aerosol-generating system further comprises a capillary wick configured to convey the liquid aerosol-forming substrate from the liquid storage portion to the electric heater. The capillary wick may be in contact with liquid aerosol-forming substrate in the liquid storage portion. The capillary wick may extend into the liquid storage portion. In that case, during vaping, liquid is transferred from the liquid storage portion to the electric heater by capillary action in the capillary wick. The at least one heating element may support the capillary wick. The capillary properties of the wick, combined with the properties of the liquid, ensure that the wick is continuously wet in the heating area during vaping when there is sufficient liquid aerosol-forming substrate.

The aerosol-generating system may further comprise a temperature sensor for measuring the temperature of the at least one heating element when the heating element has been activated. The electronic circuitry may be arranged to monitor the temperature of the at least one heating element as sensed by the temperature sensor, and determine depletion of liquid aerosol-forming substrate heated by the heater based on the temperature of the at least one heating element as sensed by the temperature sensor.

If the amount of liquid aerosol-forming substrate has decreased (e.g., if the liquid storage portion is empty or substantially empty), insufficient liquid aerosol-forming substrate may be supplied to the heater, which may result in the temperature of the heating element increasing. Thus, the temperature of the heating element, as sensed by the temperature sensor, may allow the electronic circuitry to determine that the amount of liquid aerosol-forming substrate in the liquid storage portion has decreased to a desired (or, alternatively, predetermined) threshold, and may further provide an indication of an absolute amount of liquid aerosol-forming substrate in the liquid storage portion.

According to at least some example embodiments, the electronic circuitry is configured to measure the electrical resistance of the at least one heating element to ascertain the temperature of the heating element based on the measured electrical resistance.

If the amount of liquid aerosol-forming substrate has decreased (e.g., if the liquid storage portion is empty or substantially empty), insufficient liquid aerosol-forming substrate may be supplied to the heater. This may result in the temperature of the heating element increasing. If the at least one heating element has suitable characteristics of the temperature coefficient of resistance, measuring the electrical resistance of the at least one heating element will allow the temperature of the heating element to be ascertained. Thus, the temperature of the heating element, as ascertained by the electronic circuitry based on the measured electrical resistance, may allow the electronic circuitry to determine an amount of liquid aerosol-forming substrate in the liquid storage portion.

At least one example embodiment allows for a temperature sensor to be omitted, which may free valuable space in the aerosol-generating system and/or reduce costs. According to at least some example embodiments, the electrical resistance may be used both as an 'actuator' (heating element) and a 'sensor' (temperature measurement).

According to at least some example embodiments, the electronic circuitry may be configured to measure the electrical resistance of the at least one heating element by measuring the current through the at least one heating element and the voltage across the at least one heating element, and determining the electrical resistance of the at least one heating element based on the measured current and voltage. In that case, the electronic circuitry may comprise a resistor, having a desired (or, alternatively, predetermined, or further alternatively, otherwise known) resistance, in series with the at least one heating element and the electronic circuitry may be configured to measure the current through the at least one heating element by measuring the voltage across the resistor, and determining the current through the at least one heating element from the measured voltage and the given resistance. The electronic circuitry may be arranged to determine depletion of liquid aerosol-forming substrate heated by the heater by monitoring an increase of the sensed or ascertained temperature over successive heating cycles as the liquid aerosol-forming substrate in the liquid storage portion is vaporized.

The electronic circuitry may be arranged to determine depletion of liquid aerosol-forming substrate heated by the heater by monitoring the rate of increase of the sensed or ascertained temperature at the start of a self-activation of the electric heater over successive self-activations of the electric heater while the liquid aerosol-forming substrate in the liquid storage portion is vaporized between the self-activations of the electric heater.

The electronic circuitry may be configured to determine an amount of liquid aerosol-forming substrate in the liquid storage portion by monitoring an increase in the value of an integral over time of the sensed or ascertained temperature over the self-activation duration of the electric heater.

According to at least some example embodiments, the electronic circuitry is configured to deactivate the electric heater when the amount of liquid aerosol-forming substrate in the liquid storage portion is estimated to have decreased to or below a desired (or, alternatively, predetermined) threshold.

According to one or more example embodiments, deactivating the electric heater may be advantageous because the adult vaper may no longer vape the aerosol-generating system once there is insufficient liquid aerosol-forming substrate. This may suppress and/or avoid generation of a vapor that does not have the desired properties and/or a relatively poor experience for the adult vaper.

The electronic circuitry may be configured to deactivate the electric heater either permanently or temporarily until conditions have changed that allow further operation of the electric heater. The electronic circuitry may deactivate the electric heater permanently by blowing an electrical fuse between the electric heater and an electric power supply. The electronic circuitry may be configured to deactivate the electric heater temporarily by switching off a switch between the electric heater and an electric power supply. When conditions have changed that allow further operation of the electric heater (e.g., after refilling an empty liquid storage portion or replacing a depleted liquid storage portion with a new one), the switch deactivating the electric heater may be turned on.

According to at least some example embodiments, the electronic circuitry is configured to indicate, to an adult vaper, when the amount of liquid aerosol-forming substrate in the liquid storage portion is estimated to have decreased to the desired (or, alternatively, predetermined) threshold. The notification may notify the adult vaper to refill or replace the liquid storage portion when necessary.

The electrically operated aerosol-generating system may comprise a user display. In this case, the indication may be an indication on the user display. Alternatively, the indication may comprise an audible indication, or any other suitable type of indication for an adult vaper.

For allowing ambient air to enter the aerosol-generating system, a wall of the housing of the aerosol-generating system (e.g., a wall opposite the electric heater, such as a bottom wall) is provided with at least one semi-open inlet. The semi-open inlet allows air to enter the aerosol-generating system, but no air or liquid to leave the aerosol-generating system through the semi-open inlet. A semi-open inlet may be, for example, a semi-permeable membrane, permeable in one direction only for air, but is air- and liquid-tight in the opposite direction. A semi-open inlet may also be, for example, a one-way valve. The semi-open inlets may allow air to pass through the inlet only if specific conditions are met (e.g., a minimum threshold depression in the aerosol-generating system or a volume of air passing through the valve or membrane).

The liquid aerosol-forming substrate is a substrate capable of releasing volatile compounds that can form a vapor. The volatile compounds may be released by heating the liquid aerosol-forming substrate. The liquid aerosol-forming substrate may comprise plant-based material. The liquid aerosol-forming substrate may comprise tobacco. The liquid aerosol-forming substrate may comprise a tobacco-containing material containing volatile tobacco flavour compounds, which are released from the liquid aerosol-forming substrate upon heating. The liquid aerosol-forming substrate may alternatively comprise a non-tobacco-containing material. The liquid aerosol-forming substrate may comprise homogenised plant-based material. The liquid aerosol-forming substrate may comprise homogenised tobacco material. The liquid aerosol-forming substrate may comprise at least one aerosol-former (also referred to as a vapor-former). The liquid aerosol-forming substrate may comprise other additives and ingredients, such as flavourants.

According to at least some example embodiments, the liquid storage portion protects the liquid aerosol-forming substrate in the liquid storage portion from ambient air. Ambient light may not enter the liquid storage portion as well, so that the risk of light-induced degradation of the liquid aerosol-forming substrate may be reduced. Moreover, a relatively high level of hygiene may be maintained.

According to at least some example embodiments, the liquid storage portion is arranged to hold liquid aerosol-forming substrate for a desired (or, alternatively, predetermined) number of applications of negative pressure by an adult vaper. If the liquid storage portion is not refillable and the liquid in the liquid storage portion has been used up, then the liquid storage portion has to be replaced by the user. During such replacement, contamination of the adult vaper with liquid aerosol-forming substrate has to be suppressed and/or prevented. Alternatively, the liquid storage portion may be refillable. In that case, the aerosol-generating system may be replaced after a certain number of refills of the liquid storage portion.

According to at least some example embodiments, the aerosol-generating system comprises a power supply (e.g., a battery) within the main body of the housing. As an alternative, the power supply may be another form of charge storage device such as a capacitor. The power supply may require recharging and may have a capacity that allows for the storage of enough energy for one or more vapes. For example, the power supply may have sufficient capacity to allow for the continuous generation of vapor for a period of around six minutes or for a period that is a multiple of six minutes. In another example, the power supply may have sufficient capacity to allow for a desired (or, alternatively, predetermined) number of applications of negative pressure or discrete activations of the heater assembly.

The aerosol-generating system may comprise a main unit (also referred to as a main section or element) and a cartridge that is removably coupled to the main unit, wherein the liquid storage portion and the electric heater are provided in the cartridge and the main unit comprises a power supply and the electronic circuitry.

The aerosol-generating system is electrically operated and may be an electrically operated vaping system (electronic vaping or e-vaping system/device). In at least one example, the aerosol-generating system is portable. The aerosol-generating system may have a size comparable to a cigar or cigarette. The aerosol-generating system may have a total length between approximately 30 millimeters and approximately 150 millimeters. The aerosol-generating system may have an external diameter between approximately 5 millimeters and approximately 30 millimeters.

According to at least one other example embodiment, a method comprises: providing an electrically operated aerosol-generating system including a liquid storage portion for storing liquid aerosol-forming substrate and an electric heater including at least one heating element for heating the liquid aerosol-forming substrate; self-activating the electric heater for first time interval during a period of inactivity of the electric heater; and determining depletion of the liquid aerosol-forming substrate heated by the electric heater based on a relationship between a power applied to the heating element and a resulting temperature change of the heating element.

The amount of liquid aerosol-forming substrate may be an absolute amount or a relative amount (e.g., a percentage value) or may be a determination that there is more or less than a threshold amount of liquid aerosol-forming substrate in the liquid storage portion.

According to at least one other example embodiment, there is provided electronic circuitry for an electrically operated aerosol-generating system, the electronic circuitry being arranged to perform a method comprising: providing an electrically operated aerosol-generating system including a liquid storage portion for storing liquid aerosol-forming substrate and an electric heater including at least one heating element for heating the liquid aerosol-forming substrate; self-activating the electric heater at a particular time and for a self-activation duration in a period of inactivity of the electric heater; and determining depletion of liquid aerosol-forming substrate heated by the electric heater based on a relationship between a power applied to the heating element and a resulting temperature change of the heating element.

The electronic circuitry is configured to regulate a supply of power to the electric heater. In one example, power is supplied to the electric heater continuously following activation of the system. In another example, power may be supplied intermittently, such as on a vape-by-vape basis. The power may be supplied to the electric heater in the form of pulses of electrical current.

The electronic circuitry may comprise a microprocessor, which may be a programmable microprocessor configured to perform a method comprising: self-activating the electric heater at a particular time and for a self-activation duration in a period of inactivity of the electric heater; and determining depletion of liquid aerosol-forming substrate heated by the electric heater based on a relationship between a power applied to the heating element and a resulting temperature change of the heating element.

At least one other example embodiment provides a non-transitory computer readable storage medium having stored thereon a computer-executable instructions that, when executed on programmable electronic circuitry for an electrically operated aerosol-generating system, cause the programmable electronic circuitry to perform a method comprising: self-activating the electric heater at a particular time and for a self-activation duration in a period of inactivity of the electric heater; and determining depletion of liquid aerosol-forming substrate heated by the electric heater based on a relationship between a power applied to the heating element and a resulting temperature change of the heating element.

At least one other example embodiment provides an electronic vaping device comprising: a mouth-end piece; a pre-vapor formulation storage element configured to store a pre-vapor formulation; an electric heater including a heating element, the heating element configured to heat the pre-vapor formulation to generate a vapor; and a power supply section including electronic circuitry. The electronic circuitry is configured to: selectively apply power to the heating element during a time period between consecutive applications of negative pressure to the mouth-end piece; and determine depletion of the pre-vapor formulation based on a relationship between the power applied to the heating element and a temperature change of the heating element resulting from the power applied to the heating element.

The electronic vaping device may further include a cartridge detachably coupled to the power supply section, wherein the cartridge includes the mouth-end piece, the pre-vapor formulation storage element, and the heating element.

The electronic circuitry may be further configured to deactivate the electronic vaping device in response to determining the depletion of the pre-vapor formulation has exceeded a threshold value.

The electronic vaping device may further include a temperature sensor configured to measure a temperature of the heating element. The electronic circuitry may be further configured to monitor the measured temperature of the heating element, and to determine the temperature change based on the measured temperature.

The electronic circuitry may be further configured to measure an electrical resistance of the heating element, and to determine the temperature change of the heating element based on the measured electrical resistance.

The electronic circuitry may be further configured to: determine whether a threshold time period has expired since a last of the consecutive applications of negative pressure; and apply the power to the heating element prior to a next of the consecutive applications of negative pressure to the mouth-end piece.

Features described in relation to one example embodiment may equally be applied to other aspects of this disclosure. Features of one example embodiment may be combined with other features of other example embodiments. This also applies to features described in relation to example embodiments of the aerosol-generating system which may be applicable to example embodiments of the method. Features described in relation to example embodiments of the method may also be applicable to example embodiments of the aerosol-generating system.

BRIEF DESCRIPTION OF THE DRAWINGS

Example embodiments will be further described, by way of example only, with reference to the accompanying drawings, of which.

DETAILED DESCRIPTION

Figure 1:
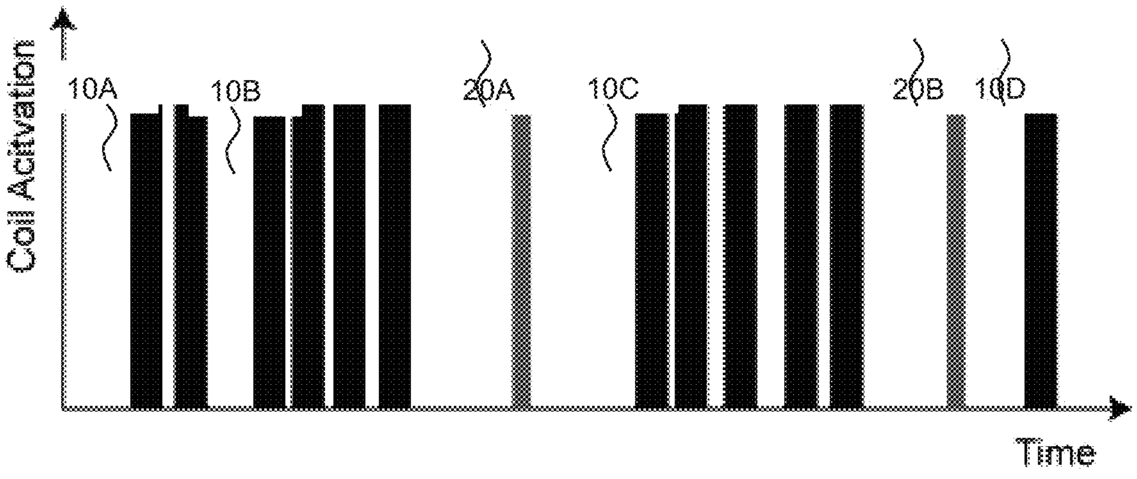
FIG. 1 is a plot showing coil activations in response to adult vaper requests for generating aerosol and self-activations of the coil over time according to an example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), SoCs, field programmable gate arrays (FPGAs), computers, or the like.

Further, one or more example embodiments may be (or include) hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 shows example coil activations over time for an example embodiment of an aerosol-generating system (also referred to herein as a vapor-generating system, an electronic vaping system/device or an e-vaping system/device) comprising a heating coil and a wick transporting liquid aerosol-forming substrate (also referred to as a liquid vapor-forming substrate or a pre-vapor formulation substrate) from the liquid storage portion (also referred to as a storage portion or a pre-vapor formulation storage portion) to the electric heater. The plot indicates the time and duration of single coil activations. The coil may be activated in response to a request for generating aerosol (also referred to herein as vapor) by an adult vaper (e.g., by applying negative pressure, or negative pressure above a threshold, to a mouth-end piece of the aerosol-generating system) or by self-activation of the electric heater during a period of inactivity of the electric heater. As discussed herein, the application of negative pressure and application of negative pressure above a threshold may also be referred to as a puff. Moreover, the application of negative pressure and application of negative pressure above a threshold will be referred to as application of negative pressure. Coil activation 10A is the first activation of the electric heater resulting from a first series of applications of negative pressure. Coil activation 10B represents the first application of negative pressure of a second series of applications of negative pressure that occurs after a break. In this case, the length of the break was short enough that no self-activation of the electric heater occurs between the first and second series of applications of negative pressure. After the second series of applications of negative pressure, a break having a length sufficiently long to trigger self-activation 20A of the coil. Subsequently, the adult vaper vapes the aerosol-generating system again and continues with a third series of applications of negative pressure starting with coil activation 10C. Again, a break having a length sufficient to trigger another self-activation 20B of the coil.

The plot in FIG. 1 shows that self-activations of the electric heater only occur when an adult vaper has not activated the heater element of the aerosol-generating system for a given time interval. According to at least one example embodiment, the time interval is selected such that the coil has cooled and the liquid wicking reaches an equilibrium or substantial equilibrium. The self-activations of the electric heater are relatively shorter in duration than the activations of the electric heater initiated by the adult vaper. The self-activations occur after a certain period of inactivity, after vaping by an adult vaper. Therefore, the infrequent self-activation does not have a large impact on the battery life if the power supply is realized by a battery.

Figure 2:
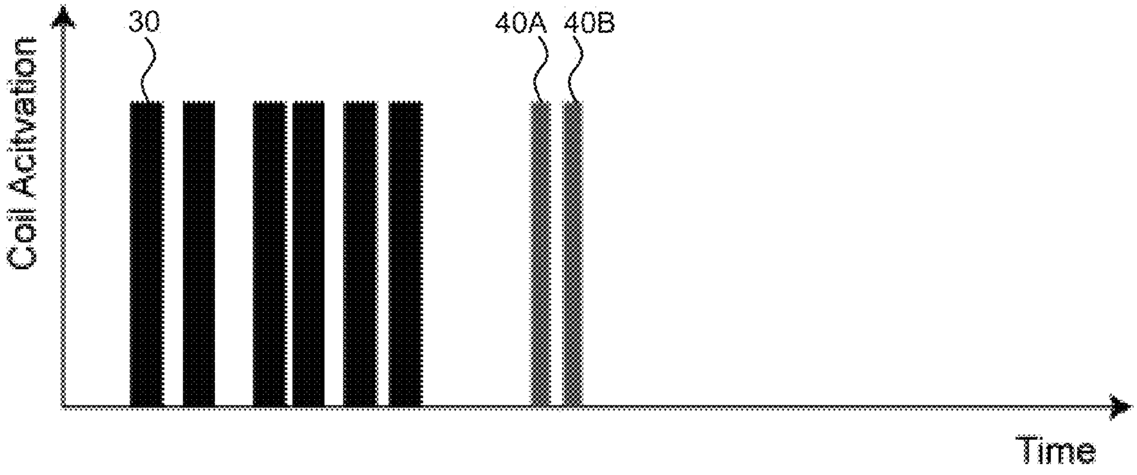
FIG. 2 is a plot showing coil activations in response to adult vaper requests for generating aerosol and self-activations of the coil over time according to another example embodiment.

FIG. 2 shows example coil activations over time for another example embodiment of an aerosol-generating system comprising a heating coil and a wick transporting liquid aerosol-forming substrate from the liquid storage portion to the electric heater. After a series of six activations of the coil 30, a break occurs, wherein the break has a length sufficiently long such that the electric heater is self-activated 40A. In the course of the self-activation of the electric heater, the depleted amount of liquid aerosol-forming is determined. In order to confirm the determined depletion, a second self-activation 40B of the electric heater is initiated to determine the depletion again. In this example, if the difference between the second determined amount and the first determined amount is below a measurement error threshold, the result is confirmed.

One or more example embodiments may improve reliability of the measurements and/or may be useful when determining that the liquid aerosol-forming substrate is depleted and a cartridge comprising the liquid storage portion should not be used any longer. Under these circumstances, the electronic circuitry of the aerosol-generating system may prohibit the further vaping of the aerosol-generating system. Prior to prohibiting further vaping, it may be advantageous to confirm the determined amount by a second measurement a relatively short time after the first measurement to avoid an erroneous deactivation of the aerosol-generating system caused by a false detection of an empty cartridge.

Figure 3:
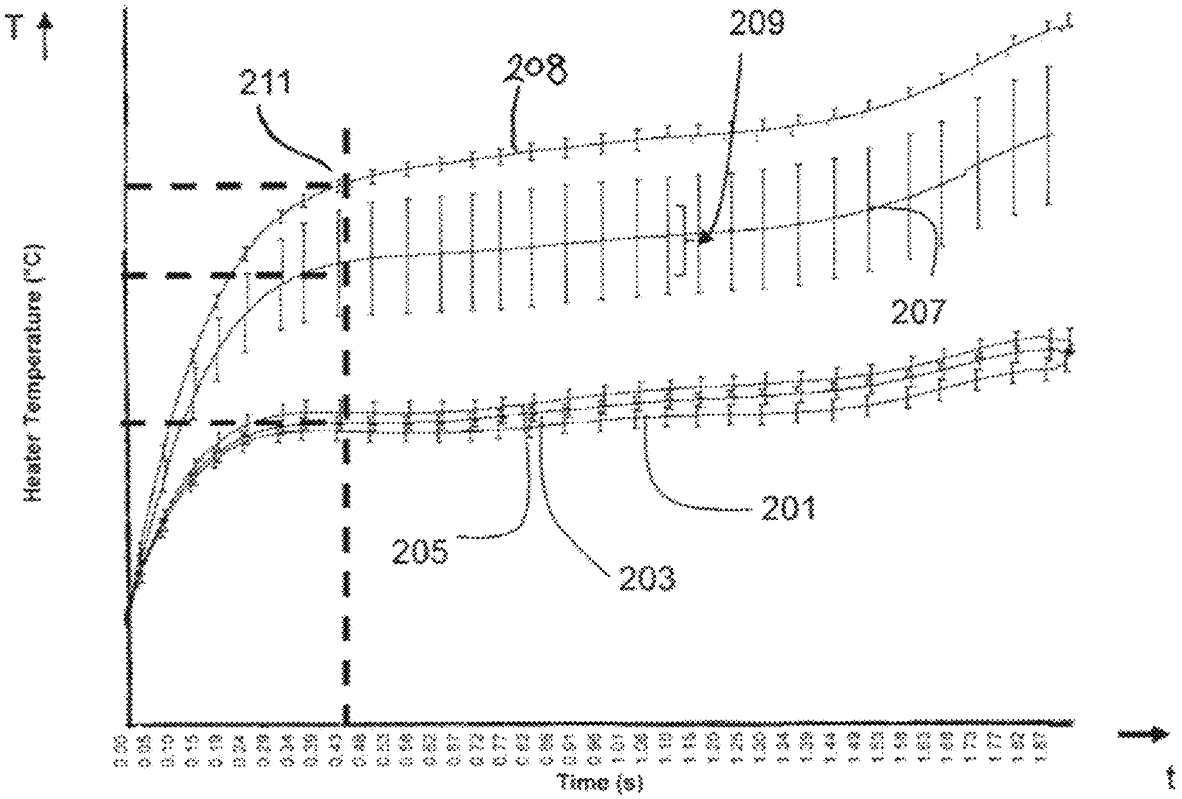
FIG. 3 is a plot showing five medians of temperature profiles of the heating element during multiple vapes of an electrically operated aerosol-generating system, according to an example embodiment.

FIG. 3 is a plot showing five example medians of temperature profiles being measured during multiple applications of negative pressure of an aerosol-generating system when the electric heater is activated in response to vaping by an adult vaper. The temperature T of the heating element is shown on the y-axis and the time t of application of negative pressure is shown on the x-axis.

Curve 201 is the median of a first set of applications of negative pressure, each application of negative pressure having a 2-second duration. Similarly, curve 203 is the median of a second set of applications of negative pressure, curve 205 is the median of a third set of applications of negative pressure, curve 207 is the median of a fourth set of applications of negative pressure and curve 208 is the median of a fifth set of applications of negative pressure. In each curve, the vertical bars (e.g., shown at 209) indicate the standard deviation around the median for those temperatures. Thus, the evolution of the measured temperature over the life of the liquid storage portion is shown. This behaviour was observed and confirmed for all liquid formulations vaporized and for all power levels used.

As can be seen from FIG. 3, the temperature response of the heating element is reasonably stable over curves 201, 203 and 205. That is, for example, the standard deviation around the median for the first three sets of applications of negative pressure is reasonably small. Over curve 207, however, two effects are noticed. Firstly, the standard deviation around the median for the fourth set of applications of negative pressure is greater. Secondly, the temperature of the heating element during each application of negative pressure has increased (e.g., significantly increased). These two effects indicate that the liquid storage portion is becoming empty.

Over curve 208, the standard deviation around the median for the fifth set of applications of negative pressure is smaller once again. That is, for example, the temperature range over the applications of negative pressure is reasonably stable. However, the temperature of the heating element during each application of negative pressure has increased further. This indicates that the liquid storage portion is substantially empty.

The temperature increase in curve 207, as compared with curve 205, is particularly evident after around 0.4 seconds of the application of negative pressure (shown by dotted line 211). Detecting that the amount of liquid in the liquid storage portion has decreased to a threshold may therefore be relatively accurately based on the temperature level of the heating element after applications of negative pressure for a duration of about 0.4 seconds.

Empirical data for particular designs of aerosol-forming substrate and for the particular system design may be stored in memory in the electronic circuitry. This empirical data may relate the temperature of the heating element at a particular point in an application of negative pressure or heating cycle operating at a given power with the amount of liquid remaining in the liquid storage portion. The empirical data may then be used to determine how much liquid is remaining and may be used to provide an adult vaper with an indication when there is estimated to be less than a desired (or, alternatively, predetermined) number of vapes remaining.

Thus, FIG. 3 demonstrates that there is a temperature increase of the heating element as the liquid storage portion becomes empty. This is particularly evident after the first 0.4 seconds of application of negative pressure. This temperature increase may be utilized to determine when the liquid storage portion is empty or nearly empty.

It can also be seen in FIG. 3 that the slope of the temperature profile between 0 seconds and 0.2 seconds increases as the liquid storage portion becomes empty. Thus, a measure of the rate of temperature increase during an initial time of application of negative pressure over the life of the liquid storage portion may provide an alternative or additional manner in which to detect an amount of the remaining liquid in the liquid storage portion.

Due to these results, the duration of the self-activation of the electric heater performed during a period of inactivity of the electric heater may be shorter than the activation duration of the electric heater during application of negative pressure. When determining the amount of depletion during a self-activation of the electric heater, faster insight into the temperature level change may be given, thereby reducing the risk of relatively poor vapor properties.

Figure 4:
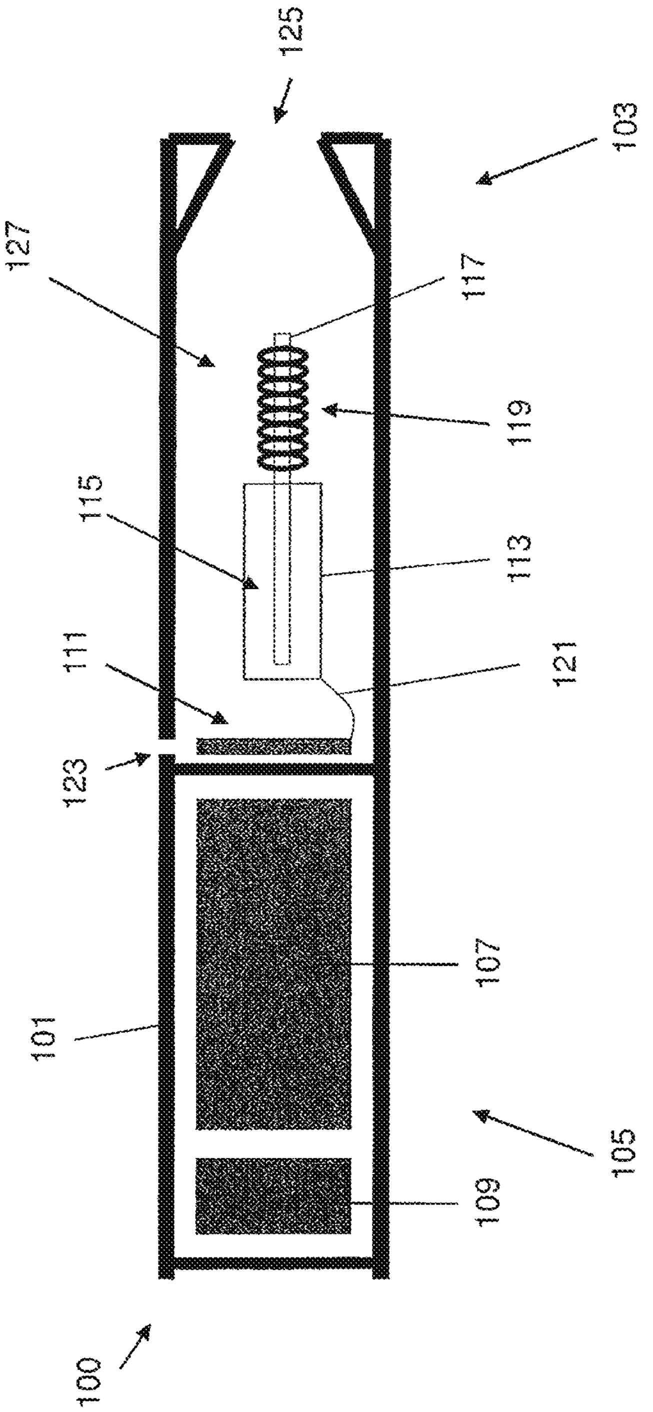
FIG. 4 shows an example embodiment of an electrically operated aerosol-generating system having a liquid storage portion.

FIG. 4 shows an example embodiment of an aerosol-generating system having a liquid storage portion. In FIG. 4, the system is an electronic vaping (or e-vaping) system. The electronic vaping system 100 of FIG. 4 comprises a housing 101 having a mouth-end piece 103 and a body end (also referred to as a power supply section) 105. In the body end 105, there is provided an electric power supply in the form of battery 107 and electric circuitry (also referred to as electronic circuitry) 109. A detection (e.g., puff detection) system 111 is also provided in cooperation with the electric circuitry 109. In the mouth-end piece 103, there is provided a liquid storage portion (also referred to as a storage portion or pre-vapor formulation storage portion) in the form of cartridge 113 containing liquid aerosol-forming substrate (also referred to as a liquid vapor-forming substrate or a pre-vapor formulation substrate) 115, a capillary wick 117 and an electric heater 119. Note that the electric heater is only shown schematically in FIG. 4. In the example embodiment shown in FIG. 4, one end of capillary wick 117 extends into cartridge 113, and the other end of capillary wick 117 is surrounded by the electric heater 119. The electric heater 119 is connected to the electric circuitry via connections 121, which may pass along the outside of cartridge 113 (not shown in FIG. 4). The housing 101 also includes an air inlet 123, an air outlet 125 at the mouth-end piece 103, and an aerosol-forming chamber 127.

In example operation, liquid aerosol-forming substrate 115 is conveyed from the cartridge 113 by capillary action from the end of the wick 117, which extends into the cartridge 113 to the other end of the wick 117, which is surrounded by the electric heater 119. When an adult vaper applies negative pressure to the mouth-end piece 103, ambient air is drawn through air inlet 123. In the arrangement shown in FIG. 4, the detection system 111 senses the negative pressure and activates the electric heater 119. The battery 107 supplies electrical energy to the heater 119 to heat the end of the wick 117 surrounded by the electric heater 119. The liquid in that end of the wick 117 is vaporized by the electric heater 119 to create a supersaturated vapor. At the same time, the liquid aerosol-forming substrate being vaporized is replaced by further liquid moving along the wick 117 by capillary action; this is sometimes referred to as "pumping action". The supersaturated vapor is mixed with and carried in the air flow from the air inlet 123. In the aerosol-forming chamber 127, the vapor condenses to form an inhalable vapor, which is carried towards the outlet 125 and drawn through the outlet 125.

In the example embodiment shown in FIG. 4, the electric circuitry 109 and detection system 111 may be programmable. The electric circuitry 109 and detection system 111 may be used to manage operation of the aerosol-generating system. This assists with control of the particle size in the vapor.

FIG. 4 shows an example of an aerosol-generating system. However, other examples are possible. In addition, note that FIG. 4 is schematic in nature. For example, the components shown are not to scale either individually or relative to one another. The aerosol-generating system may include or receive a liquid aerosol-forming substrate contained in a liquid storage portion. The aerosol-generating system includes an electric heater having at least one heating element for heating the liquid aerosol-forming substrate. Finally, the aerosol-generating system includes electronic circuitry for self-activating the electric heater at a given time and for a self-activation duration in a period of inactivity of the electric heater in order to determine depletion of liquid aerosol-forming substrate in the liquid storage portion. For example, the system need not be an electronic vaping system. A detection system need not be provided. Instead, the system may operate by manual activation, for example, an adult vaper may operate a switch when vaping. For example, the overall shape and size of the housing may be altered. Moreover, the system may not include a capillary wick. In that case, the system may include another mechanism for delivering liquid for vaporization.

Example embodiments described above illustrate but are not limiting. In view of the above discussed example embodiments, other example embodiments consistent with the above-discussed example embodiments will now be apparent to one of ordinary skill in the art.

What is claimed is:

1. An electronic vaping device comprising:

a reservoir configured to store pre-vapor formulation;

an electric heater configured to heat pre-vapor formulation drawn from the reservoir; and electronic circuitry configured to self-activate the electric heater for a first time interval during an inactivity period after a threshold number of activations of the electric heater, each activation of the electric heater being in response to application of negative pressure to the electronic vaping device, and the inactivity period being a time period during which negative pressure is not applied to the electronic vaping device, and determine at least one characteristic of the electric heater during the first time interval, and determine whether to deactivate the electronic vaping device based on the at least one characteristic of the electric heater.

2. The electronic vaping device according to claim 1, wherein the at least one characteristic of the electric heater is a temperature of the electric heater during the first time interval.

3. The electronic vaping device according to claim 2, further comprising:

a temperature sensor configured to measure the temperature of the electric heater.

4. The electronic vaping device according to claim 2, wherein the electronic circuitry is configured to determine the temperature of the electric heater based on an electrical resistance of the electric heater.

5. The electronic vaping device according to claim 1, wherein the electronic circuitry is configured to self-activate the electric heater in response to the threshold number of activations of the electric heater and a temperature of the electric heater falling below a temperature threshold.

6. The electronic vaping device according to claim 1, wherein the electronic circuitry is configured to self-activate the electric heater in response to the threshold number of activations of the electric heater and a threshold length of inactivity after a last application of negative pressure to the electronic vaping device.

7. The electronic vaping device according to claim 1, wherein the electronic circuitry is configured to estimate an amount of pre-vapor formulation in the reservoir based on the at least one characteristic of the electric heater, and determine whether to deactivate the electronic vaping device based on the amount of pre-vapor formulation in the reservoir.

8. The electronic vaping device according to claim 7, wherein the electronic circuitry is configured to adjust a frequency of self-activations of the electric heater based on the amount of pre-vapor formulation in the reservoir.

9. The electronic vaping device according to claim 7, wherein the electronic circuitry is configured to adjust a frequency of self-activations of the electric heater as the amount of pre-vapor formulation in the reservoir decreases over time.

10. The electronic vaping device according to claim 1, wherein the electronic circuitry is configured to adjust a frequency of self-activations of the electric heater as an amount of pre-vapor formulation in the reservoir decreases over time.

11. An electronic vaping device comprising:
- a reservoir configured to store pre-vapor formulation;
- an electric heater configured to heat pre-vapor formulation drawn from the reservoir; and
- electronic circuitry configured to
  - self-activate the electric heater after a threshold time period during which negative pressure is not applied to the electronic vaping device, and
  - adjust a frequency of self-activations of the electric heater as an amount of pre-vapor formulation in the reservoir decreases over time.

12. The electronic vaping device of claim 11, wherein the electronic circuitry is configured to
- determine at least one characteristic of the electric heater during a first time interval after expiration of the threshold time period, and
- estimate the amount of pre-vapor formulation in the reservoir based on the at least one characteristic of the electric heater.

13. The electronic vaping device according to claim 12, wherein the at least one characteristic of the electric heater is a temperature of the electric heater during the first time interval.

14. The electronic vaping device according to claim 13, further comprising:
- a temperature sensor configured to measure the temperature of the electric heater.

15. The electronic vaping device according to claim 13, wherein the electronic circuitry is configured to determine the temperature of the electric heater based on an electrical resistance of the electric heater.

16. The electronic vaping device according to claim 11, wherein the electronic circuitry is configured to self-activate the electric heater in response to an occurrence of at least one self-activation condition.

17. The electronic vaping device according to claim 16, wherein the at least one self-activation condition includes expiration of the threshold time period.

18. The electronic vaping device according to claim 16, wherein the at least one self-activation condition includes a threshold number of activations of the electric heater in response to application of negative pressure to the electronic vaping device.

19. The electronic vaping device according to claim 16, wherein the at least one self-activation condition includes a temperature of the electric heater falling below a threshold temperature.

20. The electronic vaping device according to claim 11, wherein the electronic circuitry is configured to
- determine at least one characteristic of the electric heater during a first time interval after expiration of the threshold time period,
- estimate an amount of pre-vapor formulation in the reservoir based on the at least one characteristic of the electric heater, and
- determine whether to deactivate the electronic vaping device based on the amount of pre-vapor formulation in the reservoir.

21. The electronic vaping device according to claim 11, wherein the electronic circuitry is configured to
- determine at least one characteristic of the electric heater during a first time interval after expiration of the threshold time period,
- estimate an amount of pre-vapor formulation in the reservoir based on the at least one characteristic of the electric heater, and
- adjust a frequency of self-activations based on the amount of pre-vapor formulation in the reservoir.

* * * * *